United States Patent [19]
Relyea

[11] Patent Number: 4,594,276
[45] Date of Patent: Jun. 10, 1986

[54] PRINTED, REMOVABLE BODY TATTOOS ON A TRANSLUCENT SUBSTRATE

[75] Inventor: Keith E. Relyea, St. Joseph, Wis.

[73] Assignee: Minnesota Mining and Manufacturing Company, St. Paul, Minn.

[21] Appl. No.: 597,923

[22] Filed: Apr. 9, 1984

[51] Int. Cl.[4] .......................... B41M 3/12; B32B 3/18

[52] U.S. Cl. ........................................ 428/40; 428/46; 428/78; 428/79; 428/187; 428/195; 428/202; 428/203; 428/261; 428/542.6; 428/914; 446/26; 446/27; 446/28

[58] Field of Search ............... 156/234, 235, 250, 277; 272/8 N; 427/149; 428/15, 40, 42, 46, 187, 195, 202, 203, 261, 350, 542.6, 914, 78, 79; 446/26–28

[56] References Cited

U.S. PATENT DOCUMENTS

| | | | |
|---|---|---|---|
| 2,413,537 | 12/1946 | Aberbach | 428/80 |
| 3,121,021 | 2/1964 | Copeland | 117/122 |
| 3,598,685 | 8/1971 | Lee et al. | 161/6 |
| 3,856,026 | 12/1974 | Gaydos | 132/73 |
| 3,898,357 | 8/1975 | Miller et al. | 428/42 |
| 4,094,316 | 6/1978 | Nathanson | 128/156 |
| 4,169,169 | 9/1979 | Kitabatake | 427/149 |
| 4,358,488 | 9/1982 | Dunklin et al. | 428/31 |
| 4,421,817 | 12/1983 | Pina et al. | 428/207 |

FOREIGN PATENT DOCUMENTS

| | | | |
|---|---|---|---|
| 1215007 | 12/1970 | United Kingdom | 428/914 |
| 1248731 | 10/1971 | United Kingdom | 428/914 |
| 1331744 | 9/1973 | United Kingdom | 428/914 |
| 1449883 | 9/1976 | United Kingdom | 428/914 |
| 2116074 | 9/1983 | United Kingdom | 428/914 |

*Primary Examiner*—George F. Lesmes
*Assistant Examiner*—P. R. Schwartz
*Attorney, Agent, or Firm*—Donald M. Sell; James A. Smith; Mark A. Litman

[57] ABSTRACT

This invention relates to body tattoos, and particularly adhesively applied body tattoos. In particular, the present invention relates to tattoos comprising a printed image on a translucent surface of a porous, non-woven, compacted tissue substrate with an adhesive on the back-side of the substrate. The translucent qualities of the substrate enhance the visual effect of the printed image.

5 Claims, No Drawings

PRINTED, REMOVABLE BODY TATTOOS ON A TRANSLUCENT SUBSTRATE

BACKGROUND OF THE INVENTION

Decoration of the human body has been commonplace in most human cultures. Societies from the most primitive in technological development to the most sophisticated by today's standards tolerate, if not promote, such decoration. The first efforts at adorning the human body were generally believed to involve the use of clays and ash to add coloration to the human body. The use of stains or dyes from flora was also used early in the development of primitive societies. These types of adornment were used for various purposes including recognition of status, signalling of marital intent or status, enhancing attractiveness to suitors, providing religious and ceremonial markings, and creation of a fearsome or frightening visage.

These types of decorations tended to be rather crude, consisting of course lines and designs. The materials used were not always readily available and the toxicological, allergenic, and bacterialogical properties of the materials tended to lack control. As societies become more sophisticated, decorations of the body, other than jewelry which could be readily added and removed, tend to become specific for different areas of the body. For example, more permanent and durable coloring solutions were used on the nails of the hands and feet, brightly colored waxes were used on the lips, tacky powders were used on the cheeks, and thick dark oil or graphite based materials were used around the eyes. These types of standardized decorations are still used in modified forms today.

More stylized or artistic decorations of the human body have always been desired by certain portions of society. Tattoos have been used as decorations of the human body for many centuries. Tattoos developed from the techniques of scarring the body to form patterns or images by texturizing the flesh of a person. The scarring formed raised areas in the skin from deep abrasion and cutting of the skin. It was probably noted after the use of dirty or colored scarring tools that coloration of the scarred flesh occurred. Purposeful addition of colorants forced under the skin by tools then followed. Modern tattoos use medical quality needles to inject non-fugitive dyes and pigments in subcutaneous patterns which are visible. The process of applying tattoos is both painful and costly, and the image is permanent.

A number of tattoo imitations have been developed to give the appearance of detailed skin or body images without the permanency or pain involved with tattoos. The three major types of substitutes include transferable dye images, painted images, and decal images. Painted images of any quality require the artistic efforts of a painter to provide a good quality image. They are relatively expensive, but provide an infinite variety of high quality images. Transferable dye images can imitate body tattoos fairly well. Usually water-soluble dyes painted on a substrate in a pattern or image are transferred by wetting the pattern or image and then pressing the wetted dyes against the skin, transferring them to the skin. This method tends to produce streaked, smeared and partial images. The dyes are water-soluble and will run and streak easily from perspiration or other liquids. Decal tattoo imitations comprise a printed image on a substrate with an adhesive material on the other side of the substrate. These decals tend to look highly artificial. The available decal body tattoos which have been marketed successfully for many years appear little better than bandaids with printed images on them.

SUMMARY OF THE INVENTION

The present invention relates to a new article which provides a quality imitation of body tattoos. The novel article comprises a flexible, porous, non-woven, compacted tissue substrate which is translucent and which has on one surface a printed image and on the other surface a pressure sensitive adhesive. The use of the translucent backing along with a printed image provides new visual characteristics and utilities to the tattoo articles. The images blend more naturally with the skin to which they are adhered because the non-image background areas allow the skin to be seen around the image and often, in part, through the image as occurs with a tattoo. This appearance provides an imitation, removable tattoo applique that is strikingly similar to a real body tattoo.

DETAILED DESCRIPTION OF THE INVENTION

The present invention relates to an article comprising a flexible, porous, non-woven, compacted tissue or compacted fibrous translucent substrate having at least one surface, a printed image over said one surface, and a pressure sensitive adhesive on the other surface of said substrate. The substrate is a film or sheet material which may effectively be of any polymeric film as long as the substrates are translucent. By "translucent" according to the present invention, it is meant that at least 30% (and preferably at least 50 or 75%) of incident visible light is transmitted or that at least 80% of light within a 50 nm band is transmitted through the substrate when adhered to a surface without perfect optical clarity through the substrate. It is highly preferred that the surface of the substrate be non-reflective, and not have a shiny appearance. The texture of the substrate should be similar to that of skin (not perfectly smooth) and the surface should not be much shinier than skin to blend in well.

The adhesive must be pressure sensitive. It is generally preferred that the adhesive be pressure sensitive and moisture transmissive for ease of application and comfort. Well known acrylic and polyurethane pressure sensitive compositions are particularly desirable. Where the article is applied to the skin as a tattoo, the pressure sensitive adhesive must be hypoallergenic. Materials such as the pressure-sensitive, hypoallergenic, synthetic, acrylic adhesives used on surgical tapes such as that shown in U.S. Pat. No. 3,121,021 are particularly preferred.

The substrate, as previously noted, must be translucent polymeric fibrous film or web. Fiber materials such as polyesters, polyvinyl resins, cellulose acetate, cellulose accetate butyrate, cellulose acetate proprionate, polyolefins, rayon, polyamides and the like may be used. Non textile additives such as wood pulp, and natural fiber or particulates may be used as fill. The conventional so-called frosted tapes which are not fibrous may not be used as they do not flex well and tend to easily separate from skin in the practice of the present invention.

The preferred substrates of the present invention comprise breathable surgical tape materials, such as those described in U.S. Pat. No. 3,121,021. These are thin, porous, pliant non-woven backings. The backing may be highly conformable and resilient yet be inextensible, not stretching appreciably, under normal hand pulling. The preferred backing or substrate is a non-woven, compacted tissue formed of interlaced staple or continuous textile fiber (most preferably rayon or the like) having an average length between 1 and 10 cm. The fibers are unified into a tissue by a binding agent which tends to bend the fibers at their cross-over points. Polymeric binders such as latex (particularly rubbery latex such as acrylates and urethanes) are preferred. The resulting, most preferred substrate is describable as a thin, pliable, inextensible, resilient, water-resistent, translucent cloth-like or tissue fabric. The unified non-woven reticular fibrous substrate has a large number of minute passage ways per square inch and is highly porous to air and moisture. Often the individual fibers of the non-woven fabric are coated with the adhesive. It is desirable for the substrate to be moisture vapor permeable at a rate of 50–1000 grams per 100 square inches of surface area per day.

The imperfect, porous surface of the substrate does not accept a perfect printing thereon, and the variations in the printed image caused by the texture of the substrate actually makes the applied tattoo look more like a real body tattoo which tends to show variations as dyes migrate with aging.

The printed image may be partially precut so that the edge of the applique is the perimeter of the image, or any shape may be cut (e.g. circular, square, irregular) so that the transparency of translucency of the backing without printing thereon allows the image to stand out.

The imitation body tattoos of the present invention may be provided in a number of different forms. Small sheets of a carrier material such as paper or polymeric film may carry the tattoos with the adhesive surface against the carrier. The tattoo may be fully cut-out on the carrier, may be cut-out with the remainder of the carrier covered with scrap substrate, may be part of an uncut fully transferable sheet, or may be partially cut-out, with additional separation from the surrounding scrap necessary before removal and application.

The cut-out from the support, if used, may be as a complete outline of the printed image, may correspond to the image and include an additional portion of the unprinted substrate with the image, or may be cut in a geometric or general design about the image. Circular and square cutouts including the printed image therein are commonly used as is the cut corresponding to the general shape of the image.

The printed image may be in a single color or multiple colors. It may be outlined with a dark (e.g., black) line as are many printed images or comprise an image composed of only the colors contributing to the image. The printing may be done by any of the conventional methods including, but not limited to, relief printing, lithographic printing, screen printing and ink-jet printing.

The substrates of the invention also provide excellent conformity to the various shapes of the body to which they are applied. The tape conforms well to convex surfaces like the cheeks, shoulders and arms as well as concave surfaces such as the palms of the hands. The substrates will remain strongly adhered on these surfaces even with flexing.

EXAMPLE 1

The images of a personified grape was lithographically printed onto two substrates: one a glossy transparent cellulose acetate film stock, and the other a commercially available thin, microporous, flexible, inextensible rayon surgical tape. The back-side of both films had been precoated with a hypoallergenic, acrylic pressure-sensitive adhesive with a release layer (strippable carrier layer) over the adhesive. Some samples were cut along the perimeter of the image and other samples were cut in circles circumscribing the image. The strippable layer was removed from the appliques and the samples applied to skin on the arm of a person. The transparency of one backing allowed the printed image to stand out clearly and on casual examination, the substrate was highly noticeable and shiny. This gave a very artificial appearance to the tattoo. With the surgical tape substrate, a very good tattoo-like image was displayed that could be readily peeled off and provided durable adhesive contact to the skin with only hypoallergenic materials. The printed image on the transparent backing clearly appeared to be a pasted-on image with a highly artificial appearance in comparison to the surgical tape backing.

EXAMPLE 2

Example 1 was repeated using a commercially available Micropore® (3M) surgical tape with a multicolored rose image printed thereon. The applied tattoo was quite lifelike and the non-reflective surface of the substrates provided by a very convincing imitation of a body tattoo. The image gave the appearance of depth as if it were in the skin and not merely applied to its surface.

I claim:

1. An imitation body tattoo applique article consisting essentially of:

(A) a translucent, porous, non-woven compacted organic polymeric filamentary substrate layer, (B) on one side of said substrate layer a pressure sensitive adhesive layer, and (C) on the other side of said substrate layer a water-resistant printed image, wherein said substrate is cut so that the edge of the applique article is the perimeter of the image.

2. The article of claim 1 wherein said substrate layer has a non-reflective surface.

3. The article of claim 1 wherein said substrate layer has a non-reflective surface and is flexible and inextensible.

4. The article of claim 1 wherein said substrate layer allows at least 50% of incident radiations in non-printed areas to pass through the substrate without providing perfect optical clarity.

5. The article of claim 1 wherein said adhesive layer is strippably adhered to a carrier layer.

* * * * *